(12) United States Patent
Scherer et al.

(10) Patent No.: US 11,422,084 B2
(45) Date of Patent: Aug. 23, 2022

(54) SYSTEM FOR ANALYZING A TEST SAMPLE AND METHOD THEREFOR

(71) Applicant: California Institute of Technology, Pasadena, CA (US)

(72) Inventors: Axel Scherer, Barnard, VT (US); Amirhossein Nateghi, Pasadena, CA (US); Taeyoon Jeon, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 450 days.

(21) Appl. No.: 16/212,499

(22) Filed: Dec. 6, 2018

(65) Prior Publication Data

US 2019/0170637 A1   Jun. 6, 2019

Related U.S. Application Data

(60) Provisional application No. 62/595,362, filed on Dec. 6, 2017.

(51) Int. Cl.
*G01N 21/03* (2006.01)
*G01N 1/42* (2006.01)
(Continued)

(52) U.S. Cl.
CPC .......... *G01N 21/0303* (2013.01); *G01N 1/42* (2013.01); *G01N 1/44* (2013.01); *G01N 21/171* (2013.01);
(Continued)

(58) Field of Classification Search
CPC ........ G01N 21/0303; G01N 1/42; G01N 1/44; G01N 21/171; G01N 21/255; G01N 21/35; G01N 21/3504; G01N 21/3577
See application file for complete search history.

(56) References Cited

U.S. PATENT DOCUMENTS 4,886,358 A    12/1989  Pellenbarg et al.
6,488,892 B1 * 12/2002  Burton ............... B01L 9/523
                                                 356/244
(Continued)

FOREIGN PATENT DOCUMENTS

CN    106323873 A    1/2017
FR       2545995 A1  11/1984
(Continued)

OTHER PUBLICATIONS

Extended European Search Report issued in counterpart EP patent application No. 18885676.9, dated Jul. 16, 2021, 7 pp.
(Continued)

*Primary Examiner* — Jennifer Wecker
*Assistant Examiner* — Oyeleye Alexander Alabi
(74) *Attorney, Agent, or Firm* — Kaplan Breyer Schwarz, LLP

(57) ABSTRACT

The present disclosure is directed toward a measurement system capable of rapid spectroscopic and calorimetric analysis of the chemical makeup of a test sample. Systems in accordance with the present disclosure include a low-thermal-mass sample holder having a substrate whose surface has been engineered to create a large-area sample-collection surface. The sample holder includes an integrated temperature controller that can rapidly heat or cool the test sample. As a result, the sample holder enables differential scanning calorimetry Fourier-Transform Infrared Spectroscopy (DSC-FTIR) that can be performed in minutes rather than hours, as required in the prior art.

17 Claims, 7 Drawing Sheets

(51) Int. Cl.
  *G01N 1/44* (2006.01)
  *G01N 21/17* (2006.01)
  *G01N 21/25* (2006.01)
  *G01N 21/35* (2014.01)
  *G01N 21/3504* (2014.01)
  *G01N 21/3577* (2014.01)

(52) U.S. Cl.
  CPC ........... *G01N 21/255* (2013.01); *G01N 21/35* (2013.01); *G01N 21/3504* (2013.01); *G01N 21/3577* (2013.01)

(56) References Cited

U.S. PATENT DOCUMENTS

| | | | |
|---|---|---|---|
| 8,323,466 B2 | 12/2012 | Kim et al. | |
| 9,557,269 B2 | 1/2017 | Cherubini et al. | |
| 2005/0239211 A1 | 10/2005 | Uchihara et al. | |
| 2012/0045368 A1* | 2/2012 | Hinz | G01N 27/4145 422/69 |
| 2012/0199742 A1* | 8/2012 | Wagner | G01N 15/14 250/338.1 |
| 2012/0287418 A1 | 11/2012 | Scherer et al. | |
| 2012/0295268 A1* | 11/2012 | Furlan | G01N 21/255 435/6.12 |
| 2013/0107254 A1* | 5/2013 | Yu | G01J 3/44 356/301 |
| 2017/0097345 A1* | 4/2017 | Oo | B01L 3/502715 |

FOREIGN PATENT DOCUMENTS

| | | | | |
|---|---|---|---|---|
| KR | 10-2012-0084090 A | 7/2012 | | |
| WO | 2004/048929 A2 | 6/2004 | | |
| WO | WO-2012001370 A1 * | 1/2012 | ............ | G01N 21/35 |
| WO | 2014/007401 A1 | 1/2014 | | |
| WO | 2016/168386 A1 | 10/2016 | | |

OTHER PUBLICATIONS

Authorized Officer Blaine R. Copenheaver, International Search Report and Written Opinion issued in International PCT Application No. PCT/US2018/064340 and dated Jan. 31, 2019.

Notice of Allowance issued in U.S. Appl. No. 16/901,352, filed May 13, 2022, 9 pp.

Final Rejection dated Mar. 10, 2022 for U.S. Appl. No. 16/901,352.

* cited by examiner

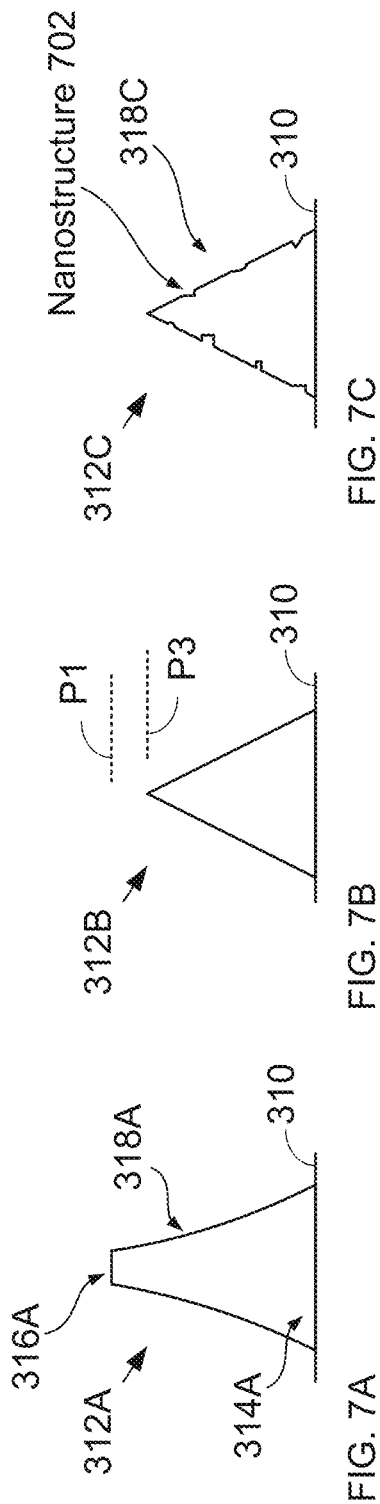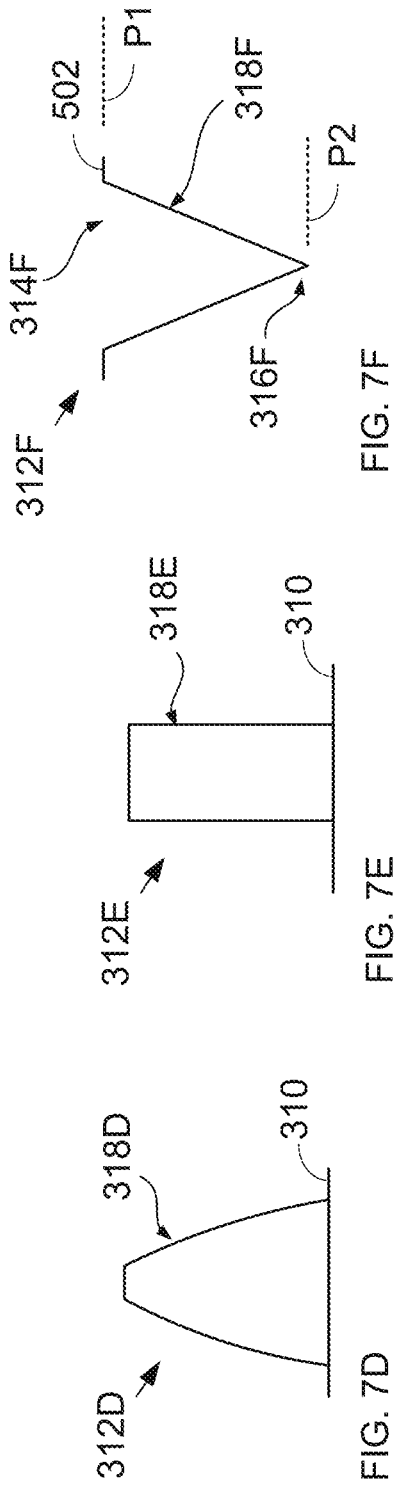

SYSTEM FOR ANALYZING A TEST SAMPLE AND METHOD THEREFOR

CROSS REFERENCE TO RELATED APPLICATIONS

This case claims priority of U.S. Provisional Patent Application Ser. No. 62/595,362, filed Dec. 6, 2017, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates generally to chemical analysis and, more particularly, to spectroscopic and calorimetric analysis methods and apparatus suitable for use in spectroscopic and calorimetric analysis systems.

BACKGROUND OF THE INVENTION

Spectroscopy is an important analytical tool for identifying analytes contained within a test sample through the measurement of a characteristic pattern of radiation-absorption peaks that is unique to the bonding structure of any chemical. The pattern of absorption peaks for a chemical, therefore, can function as a spectral "fingerprint" for that chemical.

The mid-infrared (MIR) spectral range (defined herein as the wavelengths within the range of approximately 2 microns to approximately 15 microns) represents a particularly information-rich spectral region because of the wealth of absorption peaks that exist within it for most chemicals. The MIR spectral range, therefore, is an attractive operating range for infrared spectroscopy.

Unfortunately, many mixtures contain background solvents that are highly absorptive for MIR radiation, inhibiting the ability to discern spectral content of analytes in the mixture. Furthermore, while it is relatively straight-forward to identify the chemical composition of mixtures containing only a few materials—particularly when their constituents are known, the difficulty in identifying the chemical composition increases exponentially for mixtures that are more complex. To address this problem, strategies of pre-purification and selective concentration are often employed, complicating sample preparation.

An ability to discern the composition of a test sample comprising a chemical mixture rapidly and with a high-degree of confidence would be a significant advance in the state of the art.

SUMMARY OF THE INVENTION

An advance in the art is made according to aspects of the present disclosure which describes systems and apparatus for performing chemical analysis of a test sample collected on one or more collection surfaces of a sample holder. Each sample-collection surface is structured to increase the surface area of a planar surface, thereby facilitating high-performance measurement of the test sample. Embodiments of the present invention are particularly well suited for use in spectroscopy systems, calorimetry systems, differential scanning calorimetry Fourier-transform infrared spectroscopy systems, and the like.

An illustrative embodiment in accordance with the present disclosure is an analysis system operative for performing differential scanning calorimetry Fourier-Transform Infrared Spectroscopy (DSC-FTIR) on a fluid-based test sample. The system includes a low-thermal-mass sample holder that has a geometrically patterned sample-collection surface that include a planar surface and the sidewalls and tips of a plurality of features that extend from the planar surface. The features are formed by forming a mask layer on the front surface of a substrate and etching into the bulk material of the substrate through the mask layer. The etch process removes substrate material exposed by the mask layer, thus creating a plurality of voids that facilitate deposition of the test sample on the collection surface via surface tension, as well as creating the planar surface at the bottom of the voids. The voids can also function as fluidic channels whose lateral dimensions provide a geometric filtering function for blocking the passages of particles, cells, or other materials having size greater than this lateral dimension. In some embodiments, the features are formed by chemical roughening of the front surface of the substrate, which does not require formation of a mask layer.

The sample holder includes an integrated temperature controller that, due to the low thermal mass of the sample holder, enables rapid heating and cooling of the test sample. As a result, the temperature of the test sample can be controlled to, for example, effect evaporation of its solvent to reduce its absorption of the interrogation signal, induce physical and/or chemical changes in the analyte, selectively volatize a component of the test sample, perform calorimetry of the test sample, perform cyclic measurements of the test sample, and the like.

In some embodiments, the features are formed on a flat surface of a substrate by disposing material on the surface via, for example, selective-area growth, self-assembly, the Langmuir-Blodgett method, and the like.

In some embodiments, the sidewalls of one or more of the features are roughened by forming nanostructure in its surface via a nano-structuring method such as electrochemical etching, ion-assisted etching, etc., to increase the surface-area-to-volume ratio of the sample holder.

In some embodiments, hydrophilic and/or hydrophobic surfaces are formed on the sidewalls and/or planar surface of the sample-collection surface. In some embodiments, regions of the sample-collection surface are provided one or more binding chemistries that enable localized collection of materials of interest from the test sample.

An embodiment in accordance with the present disclosure is an apparatus that includes a sample holder (104) having a sample-collection surface (304) comprising a first planar surface (310) and a plurality of features (312) that project from the first planar surface, wherein the plurality of features collectively defines a plurality of voids (320) configured to locate a test sample (112).

Another embodiment in accordance with the present disclosure is an apparatus comprising: a sample holder (104) having a sample-collection surface (304) comprising a first planar surface (310) and a plurality of features (312) that project from the first planar surface, wherein the plurality of features collectively defines a plurality of voids (320) configured to locate a test sample (112); a radiation source (102) that is operative for providing an interrogation signal (118) to the test sample; a detector (106) that is operative for detecting the spectral content of an output signal (120), wherein the spectral content is based on an interaction between the interrogation signal and the test sample; and a processor (108) that is operative for estimating the identity of a first analyte in the test sample based on the spectral content.

Yet another embodiment in accordance with the present disclosure is a method comprising: providing a sample holder having a sample-collection surface (304) comprising a first planar surface (310) and a plurality of features (312) that project from the first planar surface, wherein the plurality of features collectively defines a plurality of voids (320) configured to locate a test sample (112); and collecting the test sample on the sample-collection surface.

BRIEF DESCRIPTION OF THE DRAWINGS

FIGS. 7A-F depict schematic drawings of cross-sectional views of several non-limiting examples of alternative shapes for features 312 in accordance with the present disclosure.

DETAILED DESCRIPTION

Figure 1:
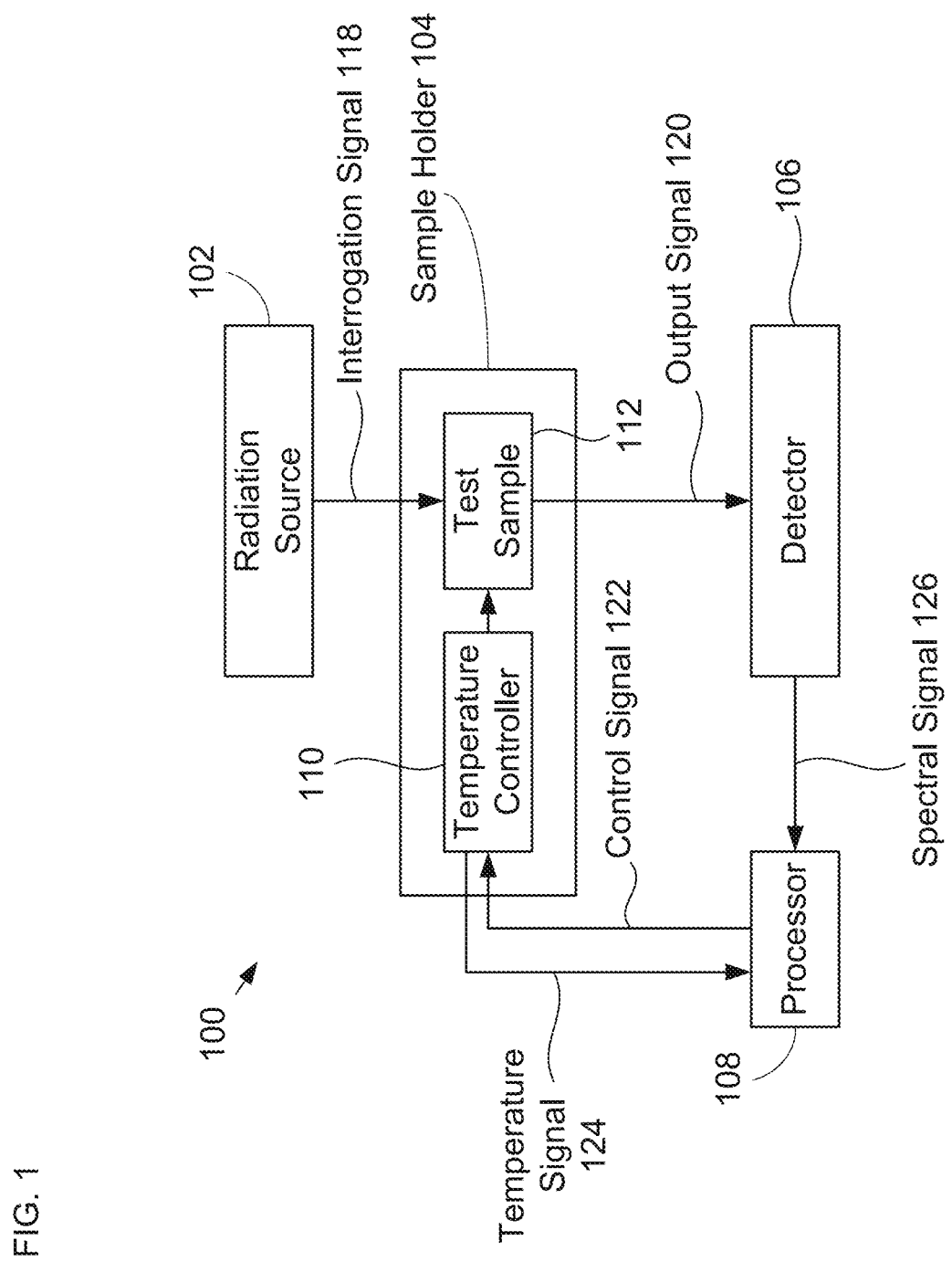
FIG. 1 depicts a block diagram of an illustrative embodiment of a chemical analysis system in accordance with the present disclosure.

FIG. 1 depicts a block diagram of an illustrative embodiment of a chemical analysis system in accordance with the present disclosure. System 100 is operative for analyzing a test sample using at least one of mid-infrared (MIR) spectroscopy and calorimetry. System 100 includes radiation source 102, sample holder 104, detection system 106, and processor 108.

Figure 2:
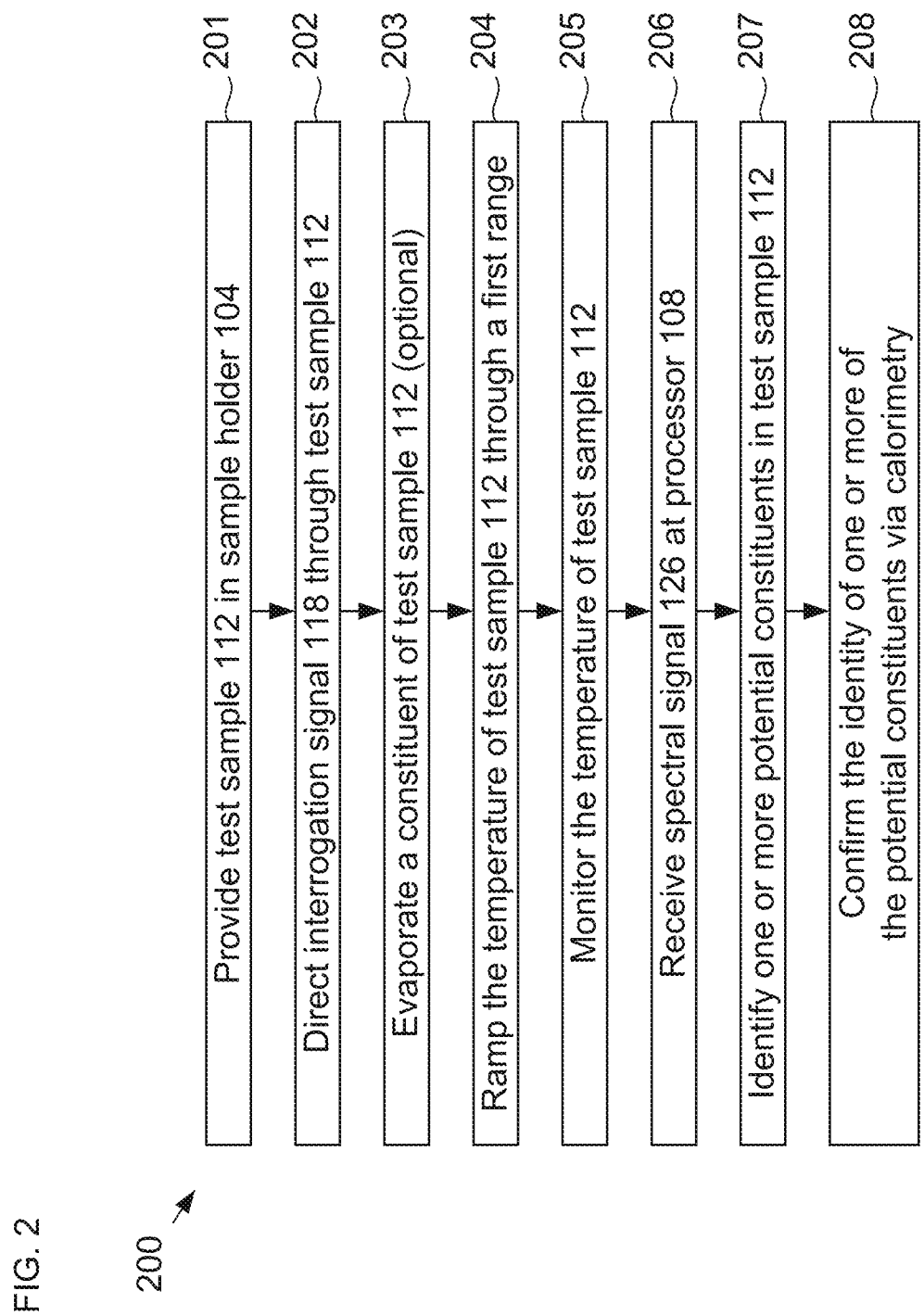
FIG. 2 depicts operations of a method for performing analysis of a test sample in accordance with the illustrative embodiment.

FIG. 2 depicts operations of a method for performing analysis of a test sample in accordance with the illustrative embodiment. Method 200 is described with continuing reference to FIG. 1 as well as reference to FIGS. 3A-B through FIGS. 7A-F.

Method 200 begins with operation 201, wherein test sample 112 is provided in sample holder 104.

Sample holder 104 is a sample-collection device that is configured to collect test sample 112 on a sample-collection surface. In the depicted example, test sample 112 is blood; however, the teachings of the present disclosure can be directed to a wide range of test samples in fluid or fluid-like form (e.g., liquids, gasses, gels, creams, suspensions, mixtures, solutions, biological fluids and sera, etc.). Embodiments in accordance with the present disclosure are particularly well suited for use in the analysis of biological fluids and sera, chemical solutions and compounds, organic solutions, petroleum products, cosmetics, gasses, and the like.

Figure 3A:
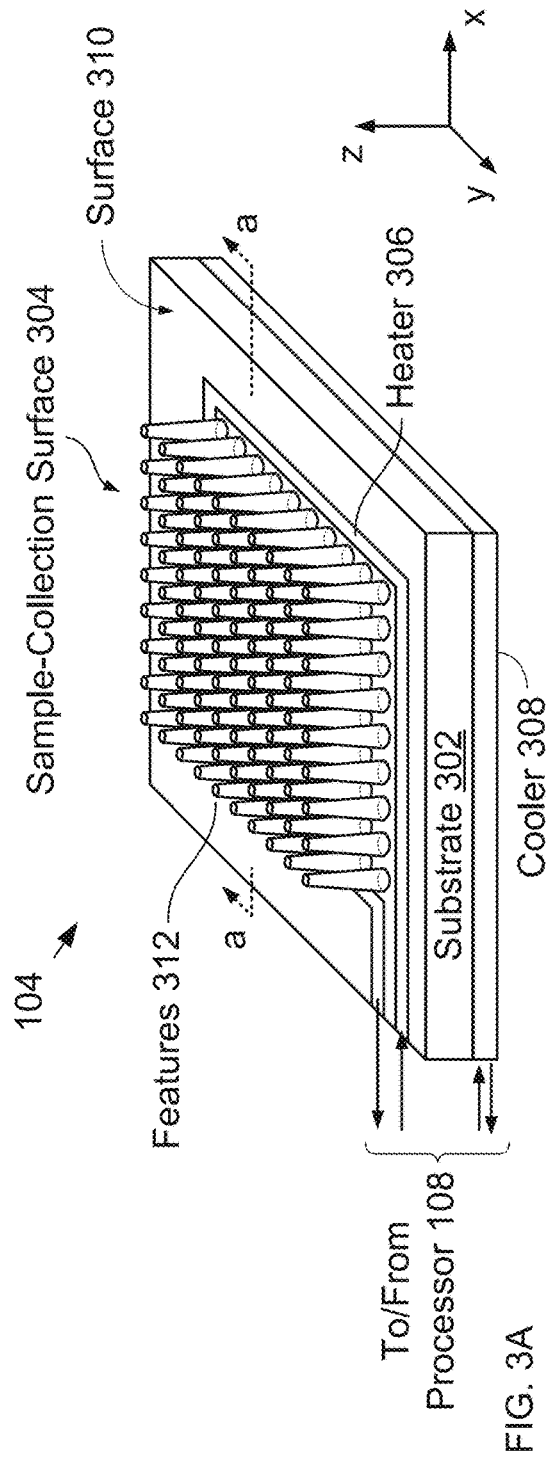
FIGS. 3A-B depict schematic drawings of perspective and sectional views of salient features of a sample holder in accordance with the present disclosure.
Figure 3B:
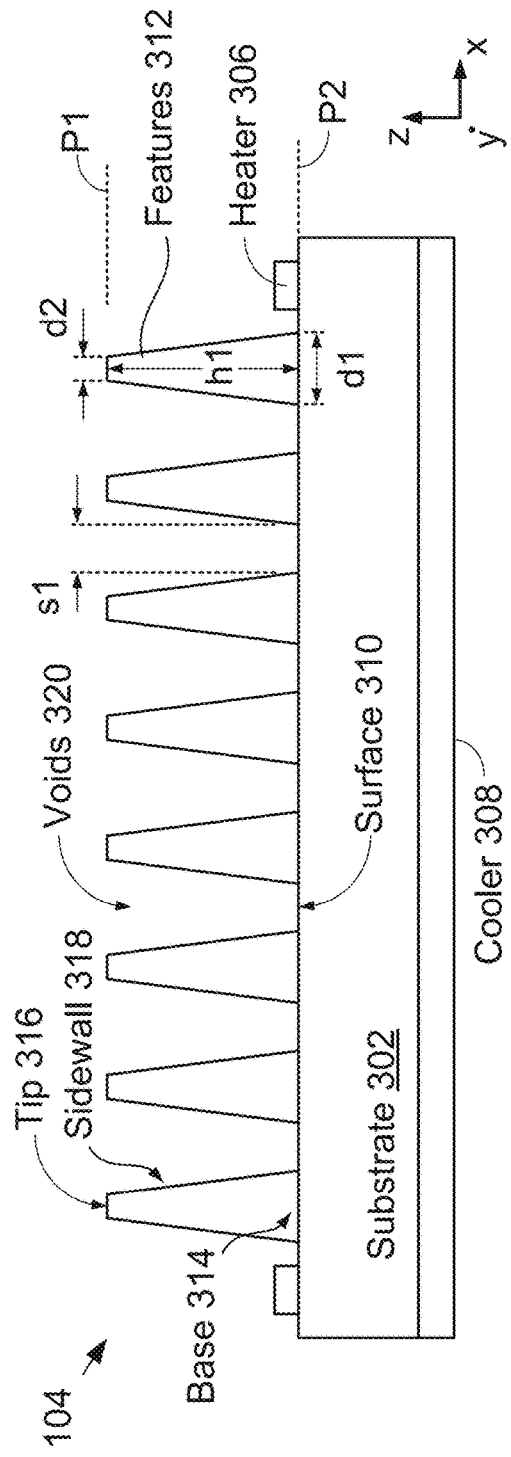

FIGS. 3A-B depict schematic drawings of perspective and sectional views of salient features of a sample holder in accordance with the present disclosure. Sample holder 104 is a fixture that is configured to enable the collection of a test sample in a plurality of voids included in an engineered sample-collection surface. Sample holder 104 includes substrate 302, sample collection surface 304, heater 306, and cooler 308.

Figure 4:
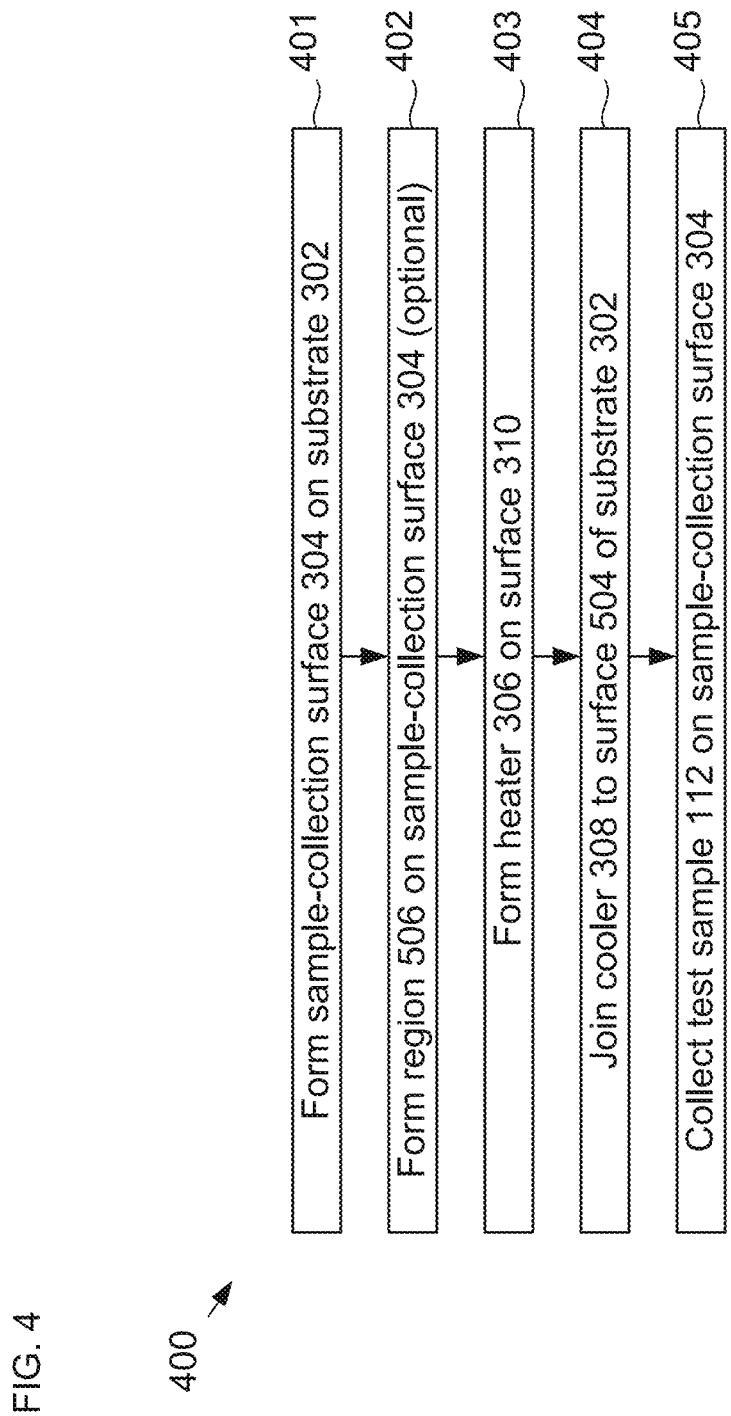
FIG. 4 depicts operations of a method for forming sample holder 104 in accordance with the illustrative embodiment.

FIG. 4 depicts operations of a method for forming sample holder 104 in accordance with the illustrative embodiment. Method 400 begins with operation 401, wherein sample-collection surface 304 is formed on substrate 302.

Figure 5A:
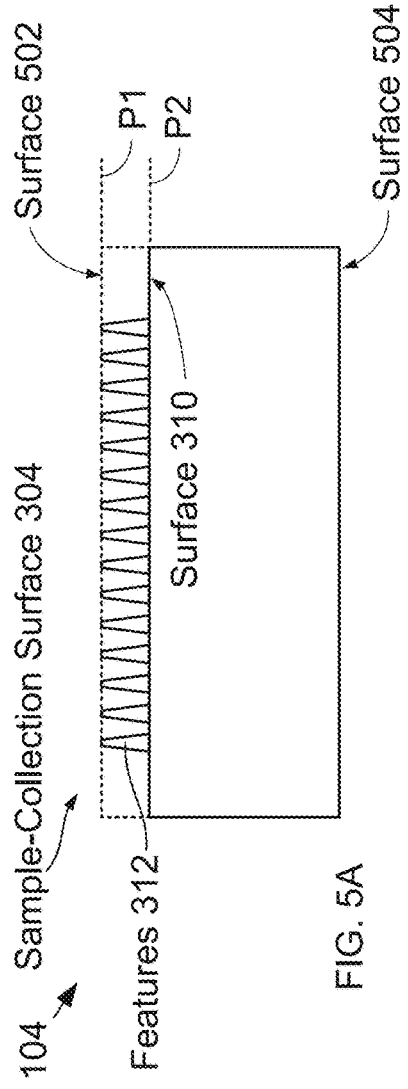
FIGS. 5A-C depict cross-sectional views of sample holder 104 at different points in its formation.
Figure 5B:
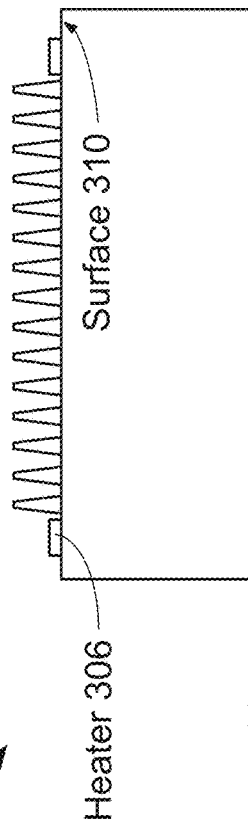
Figure 5C:
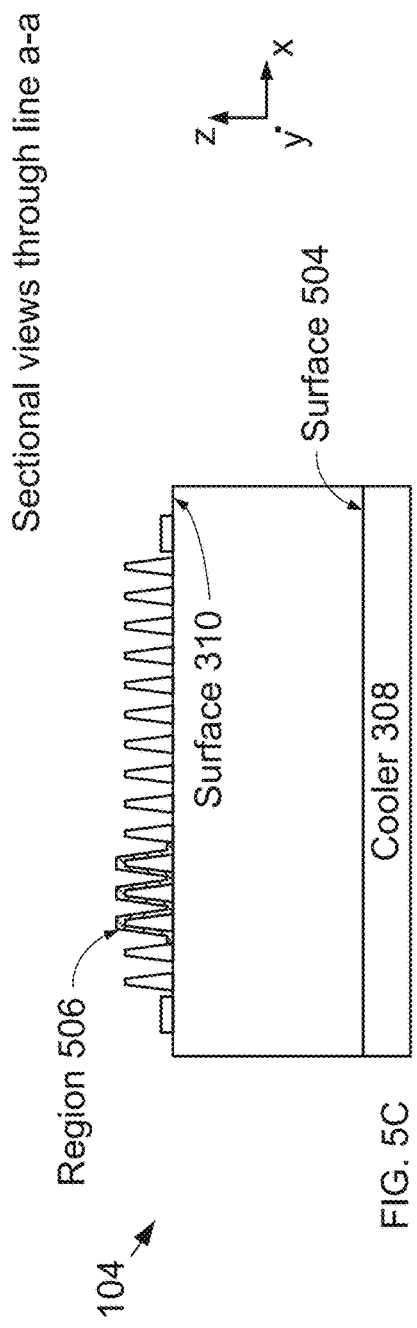

FIGS. 5A-C depict cross-sectional views of sample holder 104 at different points in its formation. The cross-sectional views shown in FIGS. 5A-C are taken through line a-a in FIG. 3A.

Substrate 302 is layer of structural material suitable for use in planar-processing fabrication. In the depicted example, substrate 302 a conventional homogeneous single-crystal silicon substrate comprising major surfaces 502 and 504. It should be noted, however, that myriad materials can be used in substrate 302 without departing from the scope of the present disclosure. Materials suitable for use in substrate 302 are those that are relatively transparent for interrogation signal 118 and include, without limitation, silicon, polysilicon, silicon compounds (e.g., silicon carbide, silicon germanium, etc.), compound semiconductors, silicon nitrides, oxynitrides, fluorides, ceramics, polymers, composite materials, and the like.

Furthermore, although it is preferable that substrate 302 is homogeneous, in some embodiments, substrate 302 comprises a bulk substrate on which one or more structural layers suitable for the formation of features 312 are disposed on at least one of surfaces 502 and 504.

Sample-collection surface 304 includes surface 310, as well as tips 316 and sidewalls 318 of features 312. To form the sample-collection surface, a mask layer suitable for defining features 312 is formed on surface 502, which defines plane P1.

Once the mask layer has been formed, features 312 are defined by etching into the bulk of substrate 302 through the mask layer via a conventional etching technique, such as a non-directional reactive-ion etch (RIE), wet etching, deep-RIE, crystallographic-dependent etching, and the like. The formation of features 312 simultaneously forms surface 310, which defines plane P2. Since surface 310 and features 312 are formed by etching into the material of substrate 302, each also comprises single-crystal silicon.

In the depicted example, features 312 is a frustum of a cone that extends from plane P2 to plane P1. Features 312 are distributed on surface 310 in a two-dimensional arrangement having an inter-feature spacing, s1.

In the depicted example, s1 is approximately 2.0 microns, which is selected to realize a geometric filtering capability for the arrangement of features 312. Such a geometric filtering capability enables the sample-collection surface to function as a "sieve" that excludes particles, cells or other materials with dimensions larger than voids 320. As a result, sample-collection surface enables concentration of specific components from a complex solution for analysis. This filtering/concentration capability affords embodiments in accordance with the present disclosure with significant advantage over prior-art sample holders because it enables improved signal-to-noise ratio (SNR) performance even for very small concentrations of analytes in a complex solution, such as biochemical material (e.g., blood, urine, sweat, tears, sputum, etc.).

In some embodiments, features 312 have different inter-feature spacings in different regions of sample-collection to enable sample holder 104 to concentrate particles, cells, etc., having different dimensions in different regions.

In some embodiments, additional fluidic-sample-collection and purification capabilities are realized by adding microfluidic channels, valves and pumps, to sample-collection surface 304. Microfluidic systems made from elastomers, or by micromachining on one surface, can be connected to such systems on the opposite surface by perforating the substrate 302 with through-holes using a highly direction etch, such as deep-RIE, photoelectrochemical etching, and the like. The addition of fluidic systems enables the analysis of liquids as well as the spectroscopic observation of chemical reactions and their correlation with spectral changes in real time. Elastomeric microfluidic materials, such as silicone elastomers, are substantially transparent for wavelengths in the MIR spectral range, and have specific peaks at known wavelengths. As a result, in some embodiments, these peaks can be used as internal "standards" against which the intensities of analyte peaks can be compared.

Each of features 312 is a having height, hi, from base 314 at surface 310 to tips 316. Base 314 has diameter, d1, and tip 316 has diameter, d2. In some embodiments, features 312 are formed such that surface 502 is completely removed and tips 316 collectively define another plane that lies below plane P1. In the depicted example, hi is approximately 5 microns, d1 is approximately 1.8 microns, and d2 is approximately 460 nm. It should be noted that a wide range of dimensions and spacings for features 312 can be used without departing from the scope of the present disclosure.

Upon completion of the structure of surface 310 and features 312, sample-collection surface 304 is typically finalized with the removal of the mask layer.

Figure 6:
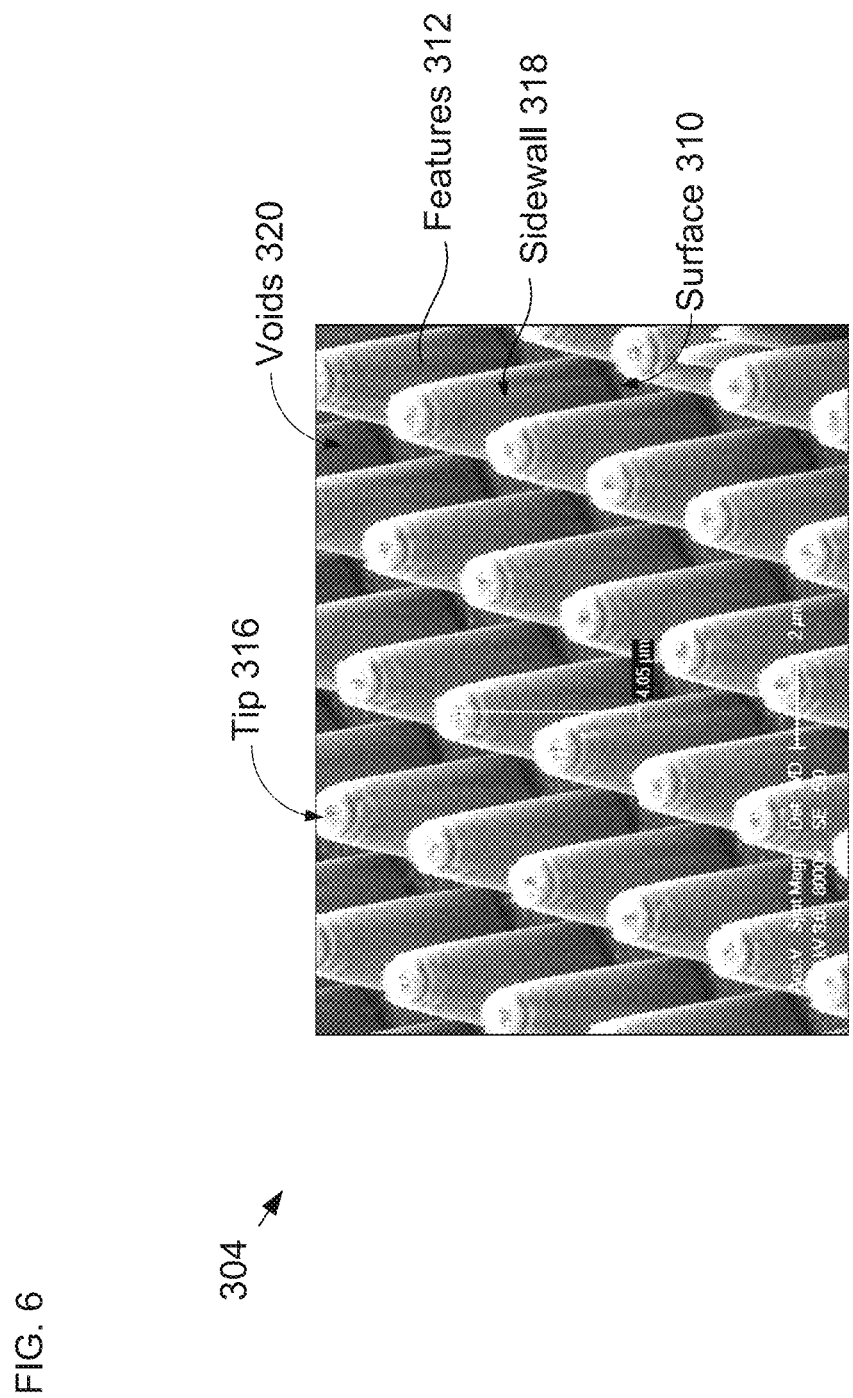
FIG. 6 depicts a photo illustration of a portion of sample-collection surface 304 in accordance with the illustrative embodiment.

FIG. 6 depicts a photo illustration of a portion of sample-collection surface 304 in accordance with the illustrative embodiment.

It should be noted that a frustum of a cone is merely one example of a suitable shape for features 312 within the scope of the present disclosure.

FIGS. 7A-F depict schematic drawings of cross-sectional views of several non-limiting examples of alternative shapes for features 312 in accordance with the present disclosure.

Feature 312A is analogous to feature 312; however, feature 312A has a concave sidewall.

Feature 312B is analogous to feature 312; however, feature 312B terminates such that tip 316 is substantially a point and feature 312B is has a conical shape. Tips 316B collectively define plane P3.

Feature 312C is analogous to feature 312B; however, feature 312C includes nanostructure 702, which serves to increase the surface area of the sidewall of the feature. Nanostructure 702 can be formed via any conventional nano-structuring process, including, without limitation, electro-chemical etching, ion-assisted etching, and the like. It should be noted that feature 312 of any shape can include nanostructure 702 without departing from the scope of the present disclosure.

Feature 312D is analogous to feature 312; however, feature 312D has a convex sidewall.

Feature 312E is analogous to feature 312; however, feature 312E has a substantially cylindrical shape.

Feature 312F is analogous to feature 312; however, feature 312F is formed such that it projects into the bulk of substrate 302 from surface 502. It should be noted that the inverted structure of feature 312F results in surface 502 defining plane P1, while the plurality of tips 316F collectively define plane P2.

It should be further noted that subtractive patterning via photolithography and etching is merely one exemplary method for defining features 312 within the scope of the present disclosure. In some embodiments, features 312 are grown on surface 310 via a conventional deposition method, such as atomic-layer deposition (ALD), self-assembly, evaporation, sputtering, evaporative or sputtered deposition through a shadow mask, selective-area growth, and the like. Furthermore, by growing features 312, they can comprise a material that is different than the surface from which they extend.

At optional operation 402, region 506 is formed on sample-collection surface 304. Region 506 is a portion of the sample-collection surface that is treated to alter its surface properties. In the depicted example, region 506 is oxidized to form a monolayer of silicon dioxide on a portion of sample-collection surface 304, thereby making region 506 hydrophilic. In some embodiments, sample-collection surface 304 includes at least one region that is treated to increase its affinity for DNA (e.g., by rinsing the surface in methanol in a bind-wash-elute process). In some embodiments, region 506 is treated to make it:

i. hydrophilic; or
ii. hydrophobic; or
iii. selectively binding for one or more desired chemistries, biological compounds, DNA, RNA, and the like; or
iv. coated with antibodies; or
v. coated with aptamers; or
vi. coated with hybridization-binding chemistries; or
vii. any combination of i, ii, iii, iv, v, and vi.

As would be apparent to one skilled in the art, after reading this Specification, surface properties of many materials can be engineered using well-known techniques, for example: hydrophilic surfaces can be readily produced on silicon by oxidizing its surface to form regions of silicon dioxide; surfaces having selective-binding chemistries for collecting materials of interest can be patterned on a wide range of surfaces; surfaces can be coated with antibodies, aptamers or hybridization binding chemistries; and the like.

In some embodiments, region 506 includes binding chemistry that gives rise to a reaction with a material of interest in test sample 112 to change the MIR spectra of the material in a predictable way. As a result, it is possible to measure a change in spectra from the reaction, rather than the natural absorption spectrum of the analytes themselves, which could have a weak absorption performance. For example, in some such embodiments, a binding chemistry that targets specific analytes to enhance their absorption contrast is employed, thereby enabling measurement of analyte concentration with greater sensitivity and/or specificity. It should be noted that such functionality is analogous to the manner in which a fluorophore tag can be optimized to provide substantially maximum fluorescence or fluorescence at a specific wavelength.

In some embodiments, region 506 is formed over the entire sample-collection surface 304. In some embodiments, a plurality of regions 506 is formed on sample-collection surface 304, where each region has the same surface properties. In some embodiments, a plurality of regions 506 is formed on sample-collection surface 304, where at least two of the regions have different surface properties.

At operation 403, heater 306 is formed on surface 310.

Heater 306 is a conventional ohmic heater comprising a trace of electrically conductive material, such as metal, through which an electric current can be run to generate heat. Although heater 306 is depicted as having a path comprising an arrangement of straight traces, in some embodiments, heater 306 is arranged in a different path shape, such as a serpentine, sinusoidal, sawtooth, spiral, or irregular path. Furthermore, in some embodiments, a heater is not integrated into sample holder 104; however, an external heat source is used to control the temperature of the test sample via convention heating, radiant heating, or another conventional heating method.

At operation 404, cooler 308 is joined to substrate 302 at surface 504. In the depicted example, cooler 308 is a conventional Peltier cooler that is bonded to surface 504 using thermally conductive adhesive. Cooler 308 has an annular shape that enables light directed through test sample 112 to pass through the cooler to detector 106. In some embodiments, sample holder 104 does not include cooler 308.

In some embodiments, cooler 308 comprises a different cooling apparatus, such as a plurality of channels formed within the body of substrate 302 that are operative for carrying cooling fluid through the substrate.

At operation 405, test sample 112 is collected on sample-collection surface 304 such that the test sample resides in voids 320.

In the depicted example, test sample 112 is dispensed onto sample-collection surface 304 by pipetting it onto the surface. In some embodiments, a different dispensing technique is used (e.g., pouring, smearing, doctor blading, spin coating, etc.).

In some embodiments, test sample 112 is accumulated on sample-collection surface 304 by cooling sample holder 104 via cooler 308 and condensing a gaseous test sample (e.g., breath, vaporized effluent, etc.) onto the surface.

Returning now to method 200, at operation 202, radiation source 102 directs interrogation signal 118 toward sample holder 104 such that the interrogation beam can interact with test sample 112 and pass through the test sample and sample holder as output signal 120.

In the depicted example, radiation source 102 is a source operative for providing interrogation signal 118 such that it includes wavelengths that span the range from approximately 2 microns to approximately 15 microns. In other words, radiation source 102 is a source of mid-infrared (MIR) radiation. In some embodiments, radiation source 102 provides an interrogation signal that includes different wavelengths (e.g., near-infrared radiation, visible light, etc.), and/or a sub-portion of the MIR spectrum.

At optional operation 203, sample holder 104 is heated to evaporate a constituent of test sample 112. In the depicted example, the sample holder is heated to evaporate water from test sample 112 (i.e., blood), which is a strong absorber of MIR radiation. By removing some or all of the water from the blood, however, the pathlength of interrogation signal 118 through the test sample can be increased and/or the remaining materials in the blood (i.e., its analytes) can be concentrated, enabling improved spectral analysis.

At operation 204, in response control signal 122 from processor 108, temperature controller 110 ramps the temperature of test sample 112 through a first temperature range.

At operation 205, processor 108 monitors the temperature of test sample 112 via temperature signal 124 from temperature controller 110.

At operation 206, processor 108 receives spectral signal 126 from detector 106. Spectral signal 126 includes spectral content, such as absorption peaks, that is based on the interaction of interrogation signal 118 with the chemical constituents of test sample 112.

At operation 207, one or more potential chemical constituents in test sample 112 are identified based on the spectral signal 126.

These potential chemical constituents are identified by observing absorption peaks in spectral signal 126 and correlating these absorption peaks with standard absorption spectra for a library of known chemicals stored in a look-up table included in processor 108.

At operation 208, processor 108 confirms the identity of one or more of the potential chemical constituents in test sample 112 based on changes in spectral signal 126 and the temperature at which the changes occur.

The identity of a chemical constituent of test sample 112 is confirmed via calorimetry, where the temperatures at which absorption peaks in spectral signal 126 disappear are correlated with the standard absorption spectra stored in the look-up table.

It should be noted that the chemical makeup of test sample 112 typically becomes simplified as its temperature is ramped, since individual components of the test sample will sequentially be altered and/or evaporate at different temperatures. As a result, the ability to generate a series of spectra at different temperatures enables the composition of a test sample comprising a complex mixture of chemicals to be readily understood. This affords embodiments in accordance with the present disclosure significant advantages over prior-art analytical systems.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus that includes a sample holder (104) comprising a homogeneous substrate (302) that includes a first planar surface (310) and a plurality of features (312) that project from the first planar surface, wherein each of the plurality of features comprises a sidewall (318) and a tip (316) that lies in a plane (P1), the plurality of tips being disconnected from one another in the plane, and wherein the first planar surface, the plurality of sidewalls, and the plurality of tips collectively define an open sample-collection surface (304) that is continuous and configured to locate a test sample (112), and further wherein the plurality of features collectively defines a plurality of voids (320) that are fluidically coupled.

2. The apparatus of claim 1 wherein the features of the plurality thereof are separated by an average spacing (s1) such that the plurality of features is operative as a filter for particles having a lateral dimension greater than the average spacing.

3. The apparatus of claim 1 wherein at least one sidewall of the plurality thereof includes at least one nanostructure (702) that increases a surface area of the sidewall.

4. The apparatus of claim 1 wherein the sample holder further includes a temperature controller (110) having an element selected from the group consisting of a heater (306) and a cooler (308).

5. The apparatus of claim 1 wherein the sample holder further includes a temperature controller (110) that includes a heater (306) and a cooler (308).

6. The apparatus of claim 1 further comprising:
a radiation source (102) that is operative for providing an interrogation signal (118) to the test sample;
a detector (106) that is operative for detecting the spectral content of an output signal (120), wherein the spectral content is based on an interaction between the interrogation signal and the test sample; and a processor (108) that is operative for estimating the identity of a first analyte in the test sample based on the spectral content.

7. The apparatus of claim 6 wherein the interrogation signal is characterized by a spectral range that is within the range of approximately 2 microns to approximately 15 microns.

8. The apparatus of claim 7 wherein the interrogation signal is characterized by a spectral range that includes wavelengths that span the range of approximately 2 microns to approximately 15 microns.

9. The apparatus of claim 7 wherein the first planar surface and each feature of the plurality thereof comprises silicon.

10. The apparatus of claim 9 further comprising a first region (506) on the sample-collection surface, wherein the first region is characterized by a surface property that is different than that of silicon.

11. The apparatus of claim 1 further comprising a first region (506) on the sample-collection surface, wherein the first region is configured to selectively bind a first analyte in the test sample.

12. An apparatus comprising:
a sample holder (104) comprising a first planar surface (310) and a plurality of features (312) that project into free space from the first planar surface, wherein each of the plurality of features comprises a sidewall and a tip that lies in a plane (P1), the plurality of tips being disconnected from one another in the plane, and wherein the first planar surface, the plurality of sidewalls, and the plurality of tips collectively define a sample-collection surface that is configured to locate a test sample (112), and further wherein the plurality of features collectively defines a plurality of voids (320) that are fluidically coupled and configured to collectively locate a test sample (112);
a radiation source (102) that is operative for providing an interrogation signal (118) to the test sample;
a detector (106) that is operative for detecting the spectral content of an output signal (120), wherein the spectral content is based on an interaction between the interrogation signal and the test sample; and
a processor (108) that is operative for estimating the identity of a first analyte in the test sample based on the spectral content.

13. The apparatus of claim 12 wherein the interrogation signal is characterized by a spectral range that is within the range of approximately 2 microns to approximately 15 microns.

14. The apparatus of claim 13 wherein the interrogation signal is characterized by a spectral range that includes wavelengths that span the range of approximately 2 microns to approximately 15 microns.

15. The apparatus of claim 13 wherein the first planar surface and each feature of the plurality thereof comprises silicon.

16. The apparatus of claim 15 further comprising a first region (506) on the sample-collection surface, wherein the first region is characterized by a surface property that is different than the surface properties of silicon.

17. The apparatus of claim 12 further comprising a first region (506) on the sample-collection surface, wherein the first region is configured to selectively bind a first analyte in the test sample.

* * * * *